United States Patent [19]

Radke

[11] Patent Number: 4,526,231
[45] Date of Patent: Jul. 2, 1985

[54] PROCESS FOR TERTIARY OIL RECOVERY USING TALL OIL PITCH

[75] Inventor: Clayton J. Radke, El Cerrito, Calif.

[73] Assignee: The United States of America as represented by the United States Department of Energy, Washington, D.C.

[21] Appl. No.: 517,138

[22] Filed: Jul. 25, 1983

[51] Int. Cl.³ .................. E21B 43/22; C09K 3/00
[52] U.S. Cl. .................. 166/270; 252/8.55 R; 252/8.55 D; 166/274; 166/275
[58] Field of Search ............ 252/8.55 R, 8.55 D; 166/275, 274, 270

[56] References Cited

U.S. PATENT DOCUMENTS

| | | | |
|---|---|---|---|
| 3,827,977 | 8/1974 | Miles et al. | 252/8.55 R |
| 3,833,718 | 9/1974 | Reed et al. | 252/8.55 R |
| 3,892,668 | 7/1975 | Chiu | 252/8.55 D |
| 4,004,638 | 1/1977 | Burdyn et al. | 252/8.55 D |
| 4,124,072 | 11/1978 | Redford | 166/270 |

*Primary Examiner*—Paul Lieberman
*Assistant Examiner*—Robert A. Wax
*Attorney, Agent, or Firm*—Harold M. Dixon; Roger S. Gaither; Judson R. Hightower

[57] ABSTRACT

Compositions and process employing same for enhancing the recovery of residual acid crudes, particularly heavy crudes, by injecting a composition comprising caustic in an amount sufficient to maintain a pH of at least about 11, preferably at least about 13, and a small but effective amount of a multivalent cation for inhibiting alkaline silica dissolution with the reservoir. Preferably a tall oil pitch soap is included and particularly for the heavy crudes a polymeric mobility control agent.

17 Claims, No Drawings

PROCESS FOR TERTIARY OIL RECOVERY USING TALL OIL PITCH

The United States Government has rights in this invention pursuant to Contract No. DE-AC03-76SF00098 between the U.S. Department of Energy and the University of California, for the operation of Lawrence Berkeley Laboratory.

FIELD OF INVENTION

This invention relates to improvement in tertiary recovery of crude oil. More particularly, this invention relates to an improved composition and process for recovering residual acidic crude oil from various reservoirs despite varying and/or relatively low natural acidity of the crude.

BACKGROUND OF THE INVENTION

Upon discovery, oil is first produced, from reservoirs, where possible, by the natural gas pressure therein. When the pressure becomes too low, the oil is then extracted with the assistance of mechanical lifting means or pumps of varying design and manner of operation. This production is referred to as primary production. When primary recovery becomes too slow, too low or totally ceases, the reservoirs usually contain well over 50% of the original oil and frequently contain over 75% and as high as about 90% to 95% of the original oil. Accordingly, it has long been the practice to use one or more secondary means of increasing the recovery of the crude oil. Among the more successful, economical and widely used secondary processes are water displacements or water floods, wherein water is pumped down one or more injection wells and out through a reservoir towards one or more production wells, pushing the oil ahead of the water-drive. Even after a successful water flood, however, about half the original oil remains in the reservoir. Much of its exists as individual globules of "residual" oil which are immobile.

Several tertiary recovery processes have been proposed to recover substantial amounts of the oil remaining in a reservoir after water flooding. Among these is injection of an aqueous solution of one or more surfactants. If properly chosen, the surfactants drastically reduce the interfacial tension between fluid phases in the reservoir and allow the residual oil globules to move. They ultimately coalesce into a continuous oil phase which flows to the production wells.

One group of effective surfactants are the carboxylic acid soaps or saponified acids which includes the natural soaps of crude oil acids. A process using such petroleum acid soaps has additional advantages over other surfactants in that they can be readily formed in-situ by injection of caustic into the reservoirs to be treated. However, an important disadvantage of such soaps are the relatively low and varying amounts of petroleum acids of the crude in different pores and/or parts of a reservoir. This provides for unpredictable and inefficient results. Additionally the caustic which is injected is frequently adsorbed or otherwise reacts with the formation so that it is thereby lost for purposes of saponification and utilizable soap or surfactant.

Other surfactants used are commercial ones such as petroleum sulfonates because of their relatively low cost and their potential availability in large quantities. However, these surfactants are effective in displacing oil only when salinities are relatively low, i.e. less than about 10% by weight. Preflushes to obviate the salinity problem have met with limited success.

Nonionic surfactants have been considered because they are not limited to low salinity but on the other hand they are quire expensive.

Another synthetic surfactant which is relatively inexpensive and potentially available in large quantities is saponified tall oil pitch. Tall oil pitch is the bottoms, a waste product from pulp paper manufacture by the sulfate process. This surfactant alone is relatively effective but nevertheless leaves room for improvement.

Strong incentives exist, therefore, to develop an improved surfactant flooding process for acidic crudes using the cheaper surfactant compositions.

OBJECTS OF THE INVENTION

A principal object of this invention is to provide an economical and efficient process and compositions useful therein for caustic flooding in a reservoir where the oil's natural acidity is low and/or where the acidity varies within the reservoir.

Among other objects of this invention is the attainment of surfactant additives which are chemically and physically compatible with soaps formed in-situ from the caustic and the crude oil acids.

Another object of this invention is to achieve the foregoing objects with economical, presently existing and commercially available materials obtainable from several sources in abundant quantities.

Still another object is to provide caustic based surfactant compositions which are less sensitive to formation depletion and interference with the alkali metal ions used for saponification.

Yet another object is to provide a surfactant composition which is less sensitive to the salinity of reservoirs containing residual oil where the connate water is soft or does not exceed a low order of hardness.

A further object is to provide a surfactant composition which does not require the use of relatively expensive co-solvents or co-surfactants such as alcohols.

An additional object is to achieve the enhanced recovery of heavy acidic crude oils.

Additional objects, advantages, and novel features of the invention will be set forth in part in the description which follows, and will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The foregoing and other objects are accomplished by injecting into a reservoir containing residual acid crude, a composition comprising:
  sufficient caustic to maintain a pH of at least about 11 and preferably about 13; and,
  a small but effective amount of a multivalent cation for inhibiting alkaline silica dissolution within the reservoir.

A preferred embodiment of the invention and one which is more advantageous for the recovery of such acid crudes is when a tall oil pitch soap is included.

The invention is particularly advantageous for recovery of heavy acidic crude oils when a mobility control material is also included.

DETAILED DESCRIPTION OF THE INVENTION

Although any acidic crude oil affords the use of this invention, crude oils most suitable for application of this invention are the relatively high acid crudes. Acid crudes, despite their relatively high acidity compared to other crudes, typically have low acid numbers of about 5 or less. Even crudes in the top of this range provide only marginal amounts of acids for tertiary oil displacement. Particularly since part of the acids do not form a surfactant when the oil is saponified. For this reason the tall oil pitch based detergents described herein are to be used in combination with the small amount of soaps formed from the acids in the crude oil. Heavy crudes have a viscosity of about 15–20 centipoise and higher (or have an API gravity of about 6–8 and higher). The heavy crudes are more difficult to recover, particularly the residual of such crudes by tertiary means. Examples of suitable crudes are Wilmington, Ca., Ranger-Zone; Whittier Crude, Whittier, CA.; Huntington Beach Oil Field (including Lower Main Zone); North Ward Estes Field, Ward and Winkler Counties, Texas, Queen Sand; Lloyd Minster Crude, Alberta, Canada.

The heavy crudes described herein are typically acidic crudes. The use of petroleum based soaps, that is the saponified acids formed in-situ, perform excellently in combination with the tall oil pitch based surfactants discussed herein and enhance the economics as well. The reasons for this are that the crude oil acid soaps and the major amount of the tall oil pitch soaps are chemically and physically compatible. It is believed that the high degree of compatibility results from the structural similarity of the carboxylic acids from which the crude oil soaps and the tall oil pitch soaps are derived. These are believed to be high molecular weight compounds which are highly aromatic in nature. They are also believed to have substantial amounts of fused-ring and poly fused-ring compounds, both aromatic and aliphatic in nature. They are relatively unsaturated although the unsaturation is not all of the benzenoid type, but includes other cyclic unsaturated compounds and unsaturated acyclic compounds.

The viscosity of heavy crudes make use of a mobility control agent advisable if not necessary to avoid fingering or channeling during the displacement of the crude. These mobility control agents are well known in the art. More usually they are polymeric in nature. Examples of these are polyacrylamides and polysaccharides (also known as Xantham gum and biopolymers).

The viscosity of the displacing solution (water or more accurately, caustic solution; saponified crude acids; tall oil pitch surfactant; and, mobility control agent) is preferably at least about 5 centipoise. Viscosities as high as about 40 centipoise can be used; however, in most cases, little if any improvement is realized at viscosities above about 15 centipoise. On balance the most preferred viscosity of the mobility control agent for the overwhelming majority of cases will be in the range of about 5 to 20 centipoise.

The tall oil pitch component is the bottoms or heavy ends of the waste product obtained by pulp paper manufacture by the sulfate or kraft process. It is derived primarily from pine woods. The pitch contains rosin acids, fatty acids (particularly oleic and linoleic acid), long chain alcohols and some sterols (e.g., phytosterol). Typically, it has an acid number of about 20–60. Further information on the tall oil pitch, if desired, can be found in "Encyclopedia of Chemical Technology", Kirk-Othmer, (2nd completely revised edition), 1969, John Wiley & Sons. The pitch is reacted with an alkali metal or an alkaline earth metal hydroxide to saponify it. For economic reasons, preferably the saponification is with either sodium hydroxide or potassium hydroxide. As to the amount of the tall oil pitch soap used in the injected displacing agent, that can vary relatively widely from about ½ to 10% but more usually about ½ to 5% by weight. The quantity can be adjusted to some extent inversely with the crude oil acid content of the reservoir to reduce costs. In most cases the quantity of this soap will be employed in the range of about 1 to 2% with large excesses avoided to prevent waste.

An extremely important additive for the displacement composition, although it is used in extremely small amounts, is a multivalent cation for suppressing alkaline silica dissolution. Silica in various forms in the rock composition of the reservoir reacts with the alkali metal in the displacement fluid and can cause a substantial loss of the alkali metal ions. Examples of the multivalent cations are Al, Ba, Pb, and Fe. The preferred metal ion for this purpose is Al. The metal ion is put into the displacing solution by adding a compatible water solution salt thereof. Examples of such are $Al(SO_4)_3$, alum [i.e., $KAl(SO_4)_2$], $Al(Cl)_3$, and aluminum citrate. Since the multivalent cation appears to function in an inhibiting fashion, the quantity or concentration can be and should be quite small from both technical and economic consideration. Thus, a small but effective amount is to be employed. This can be as low as about 2 ppm. It is rare that any more than about 50 ppm. would be employed. Preferred concentrations are about 10 to 20 ppm. for most situations.

The pH of the composition should be sufficiently high to saponify all the crude oil acid present and to provide a reserve of caustic. This can be achieved by maintaining a pH of at least about 11 and preferably about 13 of the injected composition. Any alkali solution which provides the necessary pH can be used. Examples are NaOH, KOH, Na carbonate, Na silicate and Na borate. NaOH and Na silicate are preferred.

The quantity of the treating composition can vary over a relatively wide range. Generally, at least about 0.1 pore volume is injected, but rarely, if ever, is more than about 1 pore volume employed. More usually the preferred quantity will be in the range of about 0.2–0.5 pore volume. Those skilled in the art are familiar with the determination of the quantities of displacing fluids, as well as the sequence and techniques for phasing in each slug of fluid.

In order to disclose more clearly the nature of the present invention and the advantages thereof, reference will hereinafter be made to certain specific embodiments which illustrate the herein described process. It should be clearly understood, however, that this is done by way of example and is not to be construed as a limitation upon the spirit and scope of the appended claims.

EXAMPLE

A well, either drilled for this operation or existing from previous operations and equipped for injection of fluids in conventional flood fashion, is situated traversing a formation containing residual, 30-cp crude having an acid character. Another well, either pre-existing or drilled for this operation, is situated traversing the same formation but laterally spaced and equipped for the production of fluids in conventional fashion. A conventional pre-flush of saline solution of about 2-3% salt (NaCl) is injected through the first well into the formation. This is followed by a combination of the sodium soap of tall oil pitch, caustic (NaOH) and a polyacrylamide polymer. The tall oil pitch is employed in about 5% by weight of the injected solution. The pH of the composition, when injected, is about 13 and contains sufficient polymer to provide for the composition to have a viscosity of about 10 centipoise. This can be premixed in a tank or added to the same conduit in the injection or well-head equipment. The total amount of the mixture is about ½ pore volume and preferably slightly more. This is followed by a mixture of salt water (e.g., about 2-3% salt), and the polymer with the amount of polymer being gradually reduced or feathered until only the salt water is injected in accordance with established procedures. The displaced oil is withdrawn from the production well.

While particular embodiments of the invention have been described, it will be understood, of course, that the invention is not limited thereto, since many modifications may be made; and it is therefore contemplated to cover by the appended claims any such modifications as fall within the true spirit and scope of the invention.

I claim:

1. An oil displacement composition for use in enhancing recovery of residual acidic crude oils comprising:
    on aqueous caustic solution in an amount sufficient to maintain a pH of at least about 11;
    a small but effective amount of a water soluble multivalent cation provided for in the form of a compatible water-soluble salt thereof for inhibiting alkaline silica dissolution within the reservoir; and
    about ½ to 10% of tall oil pitch soap.

2. A composition according to claim 1 wherein said multivalent cation is selected from Al, Ba, Pb and Fe.

3. A composition according to claim 2 wherein the pH is about 13 and obtained with NaOH.

4. A composition according to claim 1 wherein the pH is about 13.

5. A composition according to claim 1 wherein an additional component, a mobility control agent having a viscosity of at least about 5 centipoise is included.

6. A composition according to claim 4 wherein an additional component, a mobility control agent having a viscosity of at least about 5 centipoise is included.

7. A composition according to claim 4 wherein said multivalent cation is Al.

8. A composition according to claim 7 wherein said multivalent cation is present in the composition in the range of about 10-50 parts per million.

9. A method for enhancing the recovery of residual acidic crude oil from a reservoir bearing same comprising:
    (a) injecting into said reservoir bearing residual acidic crude oil a displacement fluid containing:
        aqueous caustic solution in an amount sufficient to maintain a pH of at least about 11; and
        a small but effective amount of a water-soluble multivalent cation provided for in the form of a compatible water-soluble salt thereof for inhibiting alkaline silica dissolution within the reservoir; and
        about ½-5% of tall oil pitch soap;
    (b) injecting an aqueous displacing fluid to drive said composition through said reservoir.

10. A method according to claim 9 wherein said multivalent cation is Al.

11. A method according to claim 9 wherein said multivalent cation is selected from Al, Ba, Pb and Fe.

12. A method according to claim 9 wherein the pH is about 13.

13. A method according to claim 11 wherein the pH is about 13 and obtained with NaOH.

14. A method according to claim 9 wherein said residual crude is a heavy acidic crude and an additional component, a mobility control agent, having a viscosity of at least about 5 centipoise is used in combination with said caustic, said tall oil pitch soap and said multivalent cation salt compound.

15. A method according to claim 13 wherein said residual crude is a heavy acidic crude and an additional component, a mobility control agent, having a viscosity of at least about 5 centipoise is included with said caustic and said multivalent cation.

16. A method according to claim 13 wherein said residual crude is a heavy acidic crude and said multivalent cation is Al.

17. A method according to claim 16 wherein said multivalent cation is present in the composition injected in the range of about 10-50 parts per million.

* * * * *